(12) United States Patent
Wee et al.

(10) Patent No.: US 10,670,476 B2
(45) Date of Patent: Jun. 2, 2020

(54) TEMPERATURE SENSING FOR USB TYPE-C CABLES

(71) Applicant: Infineon Technologies AG, Neubiberg (DE)

(72) Inventors: Tue Fatt David Wee, Singapore (SG); Yoon Hwee Leow, Singapore (SG)

(73) Assignee: Infineon Technologies AG, Neubiberg (DE)

(*) Notice: Subject to any disclaimer, the term of this patent is extended or adjusted under 35 U.S.C. 154(b) by 306 days.

(21) Appl. No.: 15/803,352

(22) Filed: Nov. 3, 2017

(65) Prior Publication Data

US 2018/0128694 A1 May 10, 2018

Related U.S. Application Data

(60) Provisional application No. 62/417,585, filed on Nov. 4, 2016.

(51) Int. Cl.
| G01K 1/00 | (2006.01) |
| G01K 7/00 | (2006.01) |
| G01K 13/00 | (2006.01) |
| G01K 15/00 | (2006.01) |
| G01K 7/01 | (2006.01) |

(52) U.S. Cl.
CPC .............. *G01K 13/00* (2013.01); *G01K 7/01* (2013.01); *G01K 15/00* (2013.01)

(58) Field of Classification Search
USPC .......................... 374/152, 178, 208, 166, 110
See application file for complete search history.

(56) References Cited

U.S. PATENT DOCUMENTS

| 2015/0288110 A1* | 10/2015 | Taniguchi | H01R 13/46 439/620.22 |
| 2015/0301552 A1* | 10/2015 | Lim | H02J 7/0052 327/538 |
| 2016/0006190 A1* | 1/2016 | Katsuura | H02H 5/04 439/502 |
| 2016/0056588 A1* | 2/2016 | Motoichi | H01R 13/7137 439/620.22 |
| 2016/0093988 A1* | 3/2016 | Yue | A41D 1/005 361/86 |
| 2017/0237205 A1* | 8/2017 | Fuehrer | B60L 3/0023 439/620.22 |
| 2018/0248356 A1* | 8/2018 | Klein | H02H 3/20 |

* cited by examiner

*Primary Examiner* — Mirellys Jagan
(74) *Attorney, Agent, or Firm* — Murphy, Bilak & Hamiller, PLLC (57) ABSTRACT

According to an embodiment of a Type-C USB cable, the Type-C USB cable comprises a near side cable plug, a far side cable plug, a single eMarker IC integrated in one of the cable plugs, the single eMarker IC including an internal temperature sensing element, a temperature sensor integrated in the opposite cable plug as the single eMarker IC, and a wire connecting the temperature sensor to the single eMarker IC. The single eMarker IC is configured to generate temperature measurement information based on temperature sensed by the internal temperature sensing element of the single eMarker IC and temperature sensed by the temperature sensor and carried to the eMarker IC over the wire that connects the temperature sensor to the single eMarker IC.

19 Claims, 8 Drawing Sheets

TEMPERATURE SENSING FOR USB TYPE-C CABLES

TECHNICAL FIELD

The present application relates to USB Type-C cables, in particular to temperature sensing for USB Type-C cables.

BACKGROUND

Figure 1:
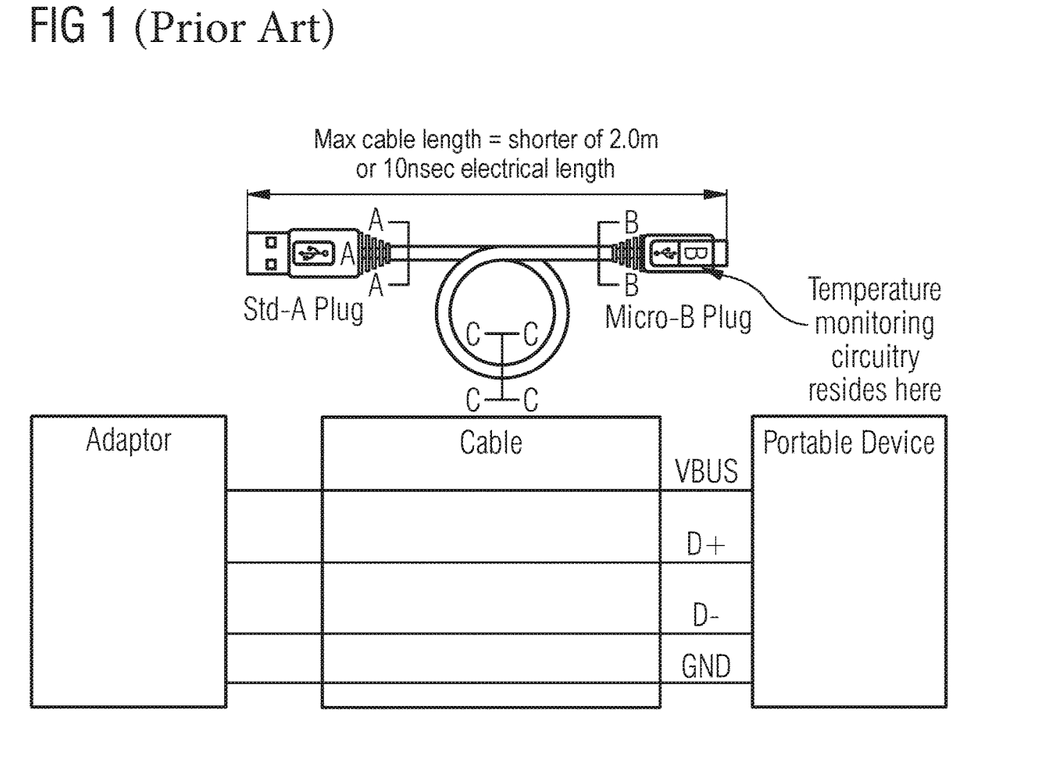
FIG. 1 illustrates a typical connection for a conventional adaptor and portable device using a standard-A to micro-B USB cable.

There are two main quick charging approaches in the supply of power from an adaptor to a portable device through a USB (Universal Serial Bus) cable. For example, if the portable device requires 30 W, one approach is to apply 10V, 3 A. Another approach is to apply 5V, 6 A. For such high current charging, temperature measurement can be adopted on the USB cable because the connector for the adaptor is typically a 'Std-A plug' and the connector for the portable device is typically a 'Micro-B plug' as show in FIG. 1, which shows a typical connection for a conventional adaptor and portable device using a standard-A to micro-B USB cable. Circuitry for temperature monitoring can be designed and resides in the Micro-B plug.

Figure 2:
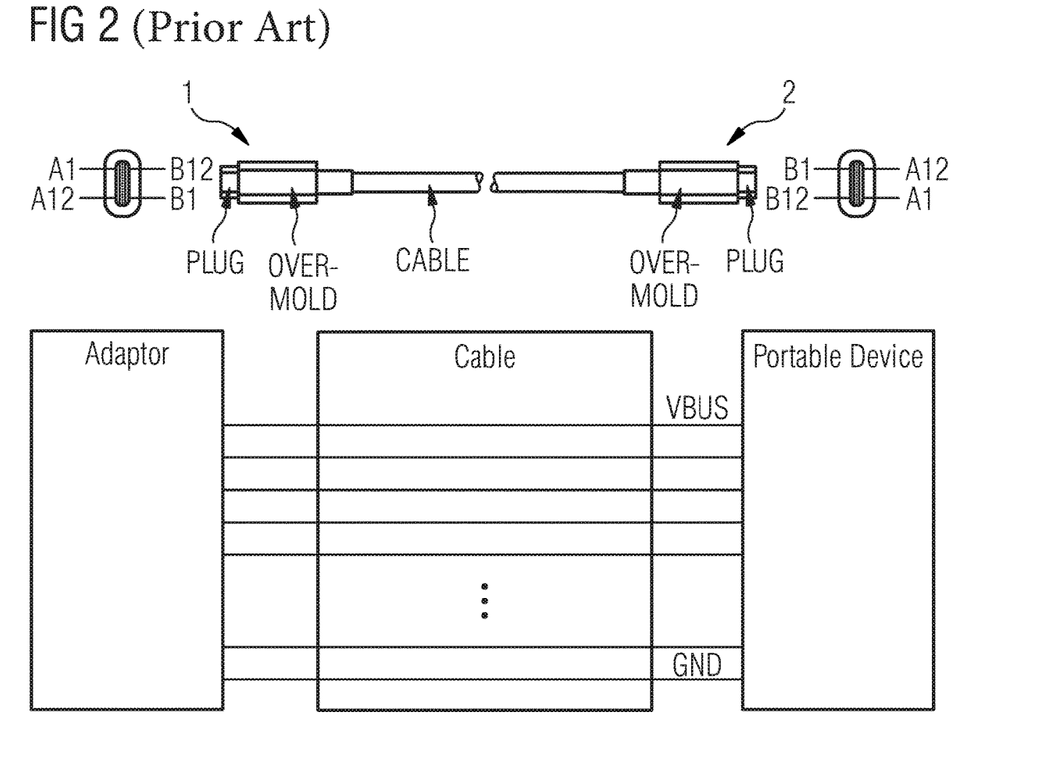
FIG. 2 illustrates a typical connection for a conventional adaptor and portable device using a USB Type-C to Type-C cable.

With the introduction of the 'Type-C' USB cables, it will be a challenge to know which side of the plug (1 or 2) is connected to the portable device side as shown in FIG. 2, which shows a typical connection for a conventional adaptor and portable device using a USB Type-C to Type-C cable. It is known that either plug can be used, as the plugs are interchangeable.

Figure 3:
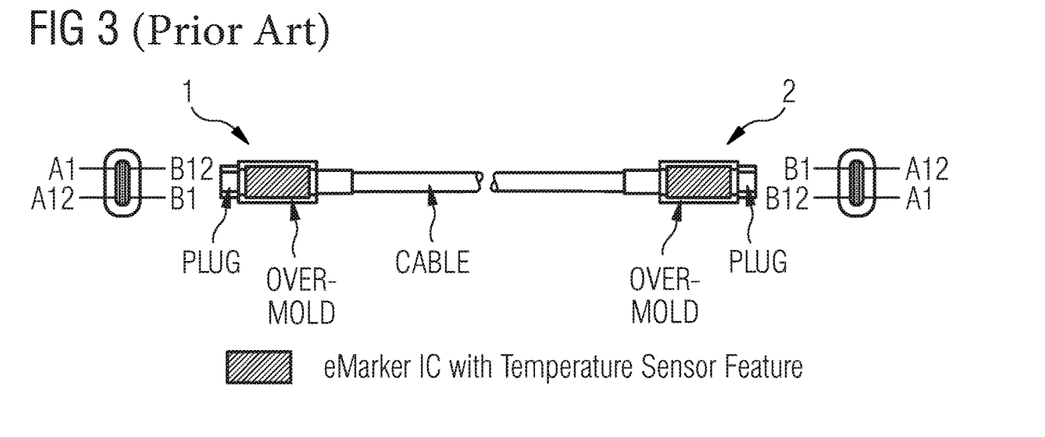
FIG. 3 illustrates a conventional solution for supporting temperature monitoring in a USB Type-C cable.
Figure 4:
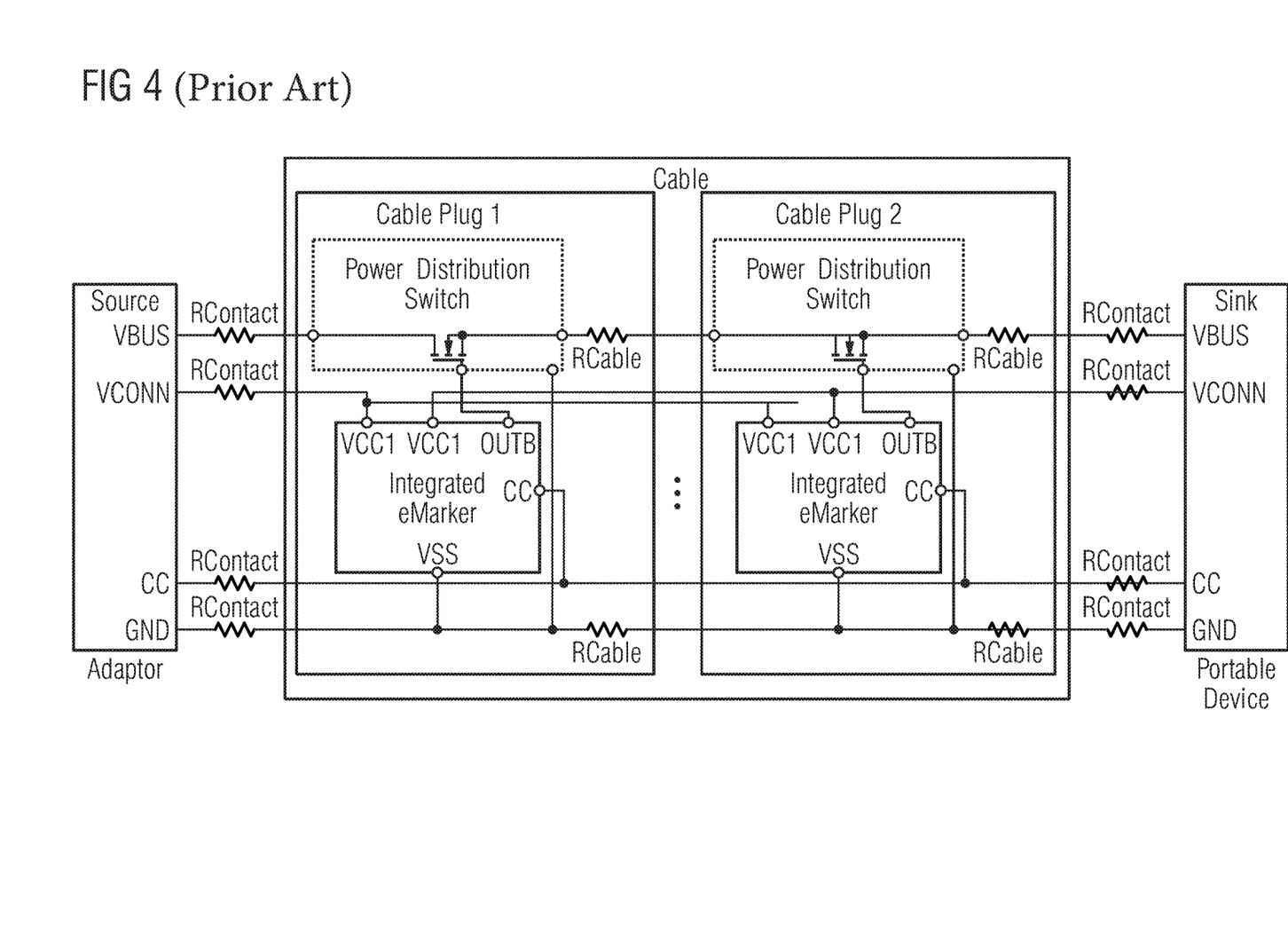
FIG. 4 illustrates another conventional solution for supporting temperature monitoring in a USB Type-C cable.

One conventional temperature monitoring approach for USB Type-C cables is to include two so-called 'eMarker ICs' in both plug locations (1 and 2), so as to monitor the temperature of the cable as shown in FIG. 3 and FIG. 4. FIG. 3 shows a first conventional solution for supporting temperature monitoring in USB Type-C cables. FIG. 4 shows a second conventional solution for supporting temperature monitoring in USB Type-C cables.

An eMarker IC for USB Type-C cables includes a controller and additional electronics such as re-drivers for re-conditioning high-speed USB data signals. In active cable designs, each end of the cable can have different active functions. A DFP (Downstream Facing Port) queries the cable to know the features supported at each end of the cable.

Figure 5:
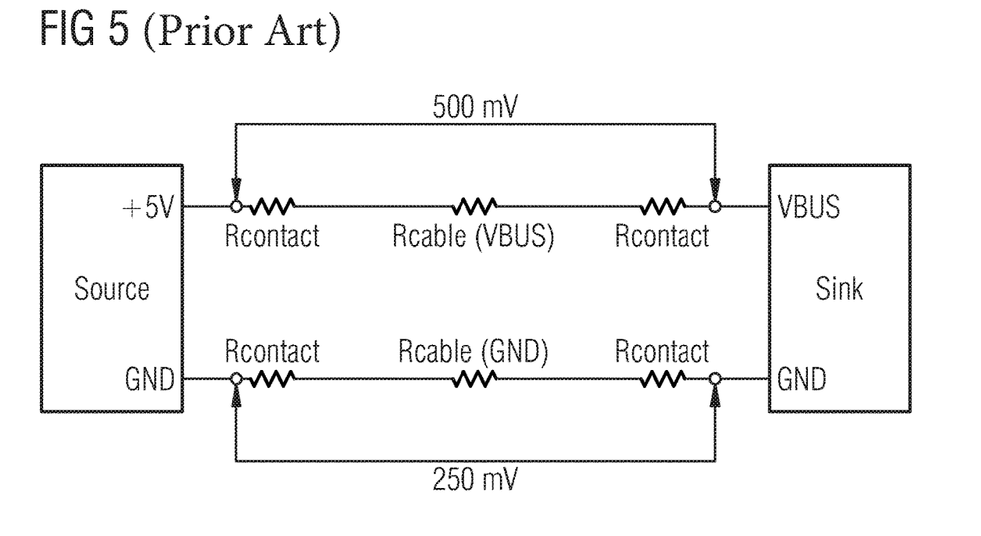
FIG. 5 illustrates IR drop requirement for USB Type-C cables.

One conventional temperature monitoring approach for USB Type-C cables is to include an eMarker IC in both plug locations, so as to monitor the temperature of the cable as shown in FIG. 3 and FIG. 4. Such a solution requires a power distribution switch in each plug for isolating the VBUS line on both sides of the USB cable in the event of an over-temperature condition. The VBUS line in USB is a wire which carries a nominal 5V supply. By including two power distribution switches and two eMarker ICs in a USB Type-C cable, system cost is increased as the cable manufacturer must ensure that the cable meets the cable IR drop requirement of USB Type-C specification between source and sink as shown in FIG. 5.

As such, there is a need for a more cost effective temperature sensing technique for USB Type-C cables.

SUMMARY

According to an embodiment of a Type-C USB cable, the Type-C USB cable comprises a near side cable plug, a far side cable plug, a single eMarker IC integrated in one of the cable plugs, the single eMarker IC including an internal temperature sensing element, a temperature sensor integrated in the opposite cable plug as the single eMarker IC, and a wire terminated within the Type-C USB cable and connecting the temperature sensor to the single eMarker IC. The single eMarker IC is configured to generate temperature measurement information based on temperature sensed by the internal temperature sensing element of the single eMarker IC and temperature sensed by the temperature sensor and carried to the eMarker IC over the wire that connects the temperature sensor to the single eMarker IC.

According to an embodiment of a method of temperature sensing for a Type-C USB cable that includes a near side cable plug, a far side cable plug, a single eMarker IC integrated in one of the cable plugs, a temperature sensor integrated in the opposite cable plug as the single eMarker IC, and a wire terminated within the Type-C USB cable and connecting the temperature sensor to the single eMarker IC, the method comprises: sensing temperature by an internal temperature sensing element of the single eMarker IC; sensing temperature by the temperature sensor; carrying the temperature sensed by the temperature sensor to the eMarker IC over the wire that connects the temperature sensor to the single eMarker IC; and generating temperature measurement information by the single eMarker IC based on the temperature sensed by the internal temperature sensing element of the single eMarker IC and the temperature sensed by the temperature sensor.

According to an embodiment of a Type-C USB cable system, the Type-C USB cable system comprises a near side cable plug, a source connected to the near side cable plug, a far side cable plug, a sink connected to the far side cable plug, a single eMarker IC integrated in one of the cable plugs, the single eMarker IC including an internal temperature sensing element, a temperature sensor integrated in the opposite cable plug as the single eMarker IC, and a wire terminated within the Type-C USB cable and connecting the temperature sensor to the single eMarker IC. The single eMarker IC is configured to generate temperature measurement information based on temperature sensed by the internal temperature sensing element of the single eMarker IC and temperature sensed by the temperature sensor and carried to the eMarker IC over the wire that connects the temperature sensor to the single eMarker IC.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

According to embodiments described herein, a system is provided for implementing temperature monitoring at both plugs of a USB Type-C cable. The system described herein requires a single eMarker chip, uses a remote temperature sensing technique, and reduces the impact of the VBUS cable resistance in the cable design.

Figure 6:
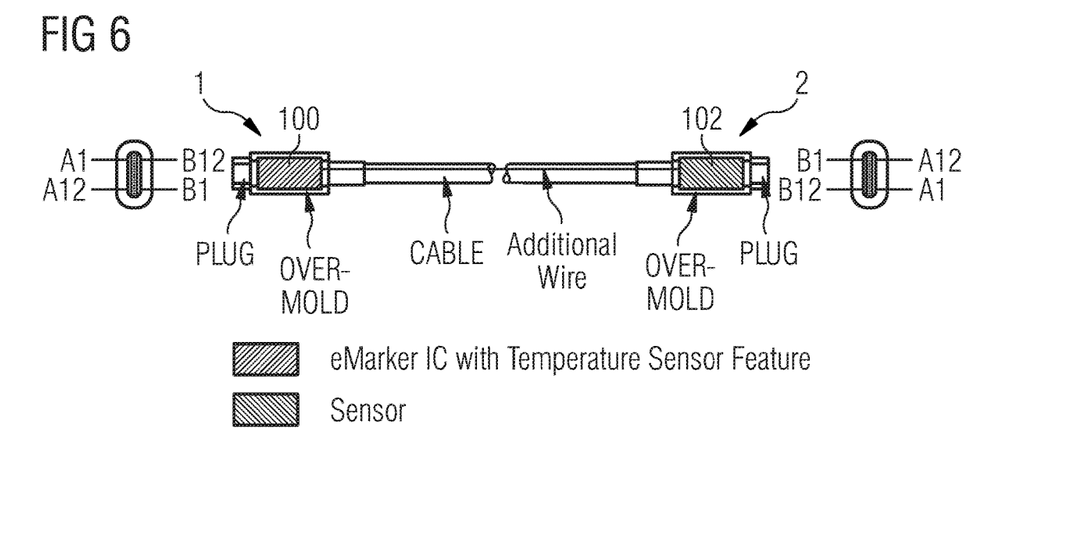
FIG. 6 illustrates a schematic diagram of an embodiment of a one-chip solution for enabling temperature monitoring at both plugs of a USB Type-C cable.

FIG. 6 illustrates an embodiment of a system that supports temperature monitoring at both plugs of a USB Type-C cable. According to this embodiment, the system includes a single eMarker chip 100 at only one side (side 1 in FIG. 6) of the USB Type-C cable. The system also uses a remote temperature sensing technique via a remote sensor 102 at the other side (side 2 in FIG. 6) of the USB Type-C cable, reducing the impact of the VBUS cable resistance in the cable design.

Figure 7:
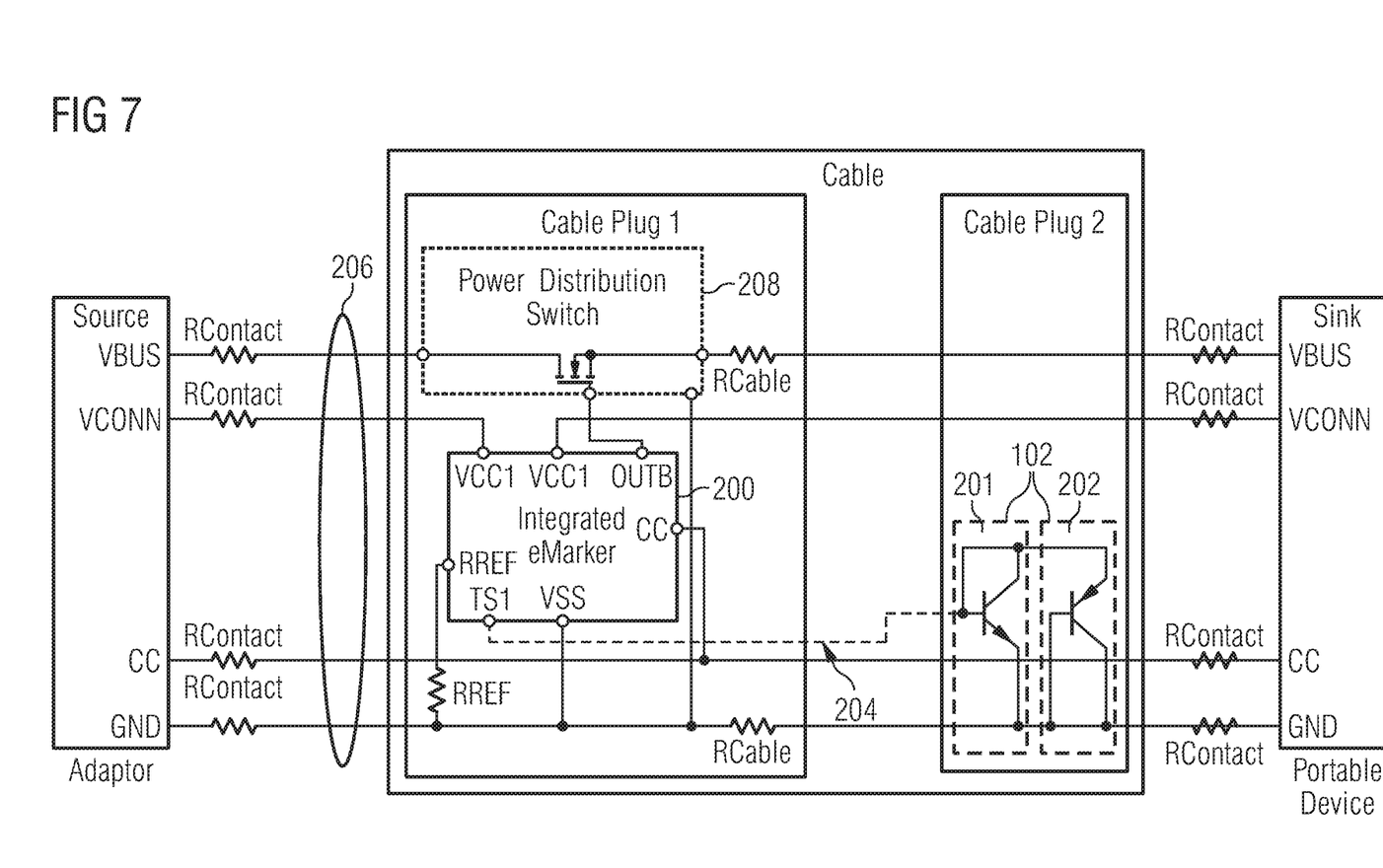
FIG. 7 illustrates a schematic diagram of the one-chip temperature monitoring solution in more detail.

FIG. 7 shows an embodiment of the system implementation in more detail. According to this embodiment, the remote sensor 102 is placed on the far side cable plug ('Cable Plug 2') for monitoring temperature. An integrated eMarker IC 200 having both internal (local) and remote temperature measuring capability is placed on the near side cable plug ('Cable Plug 1'). The eMarker IC 200 located at the near side cable plug ('Cable Plug 1') is connected to the remote sensor 102 located at the far side cable plug ('Cable Plug 2') by a new wire 204 added to the USB Type-C cable system. The new wire 204 is limited to (terminates within) the cable itself, and therefore does not affect the design of the cable plugs facing the source and sink side devices ('Source', 'Sink').

The sensor 102 located at the far side cable plug ('Cable Plug 2') can be either an NPN 201 or PNP 202 bipolar device for measuring temperature, for example. The wire 204 added to the USB Type-C cable 206 for connecting the remote sensor 102 located at the far side cable plug ('Cable Plug 2') to the eMarker IC 200 located at the near side cable plug ('Cable Plug 1') impacts the temperature data provided by the remote sensor 102. This wire resistance impact on the remotely sensed temperature is cancelled by the integrated eMarker IC 200, so as to ensure accuracy of the system.

On cable plug side '1' where the eMarker IC 200 resides, temperature measurement is done with a local temperature sensing feature of the eMarker IC 200. On cable plug side '2' i.e. the remote side, temperature sensing is done by the remote temperature sensor 102. The sensed parameter for both the local and remote temperatures are essentially the delta Vbe of a silicon PN junction diode when a ratio-metric current is passed into a bipolar junction device either on chip or off chip, respectively.

Figure 8:
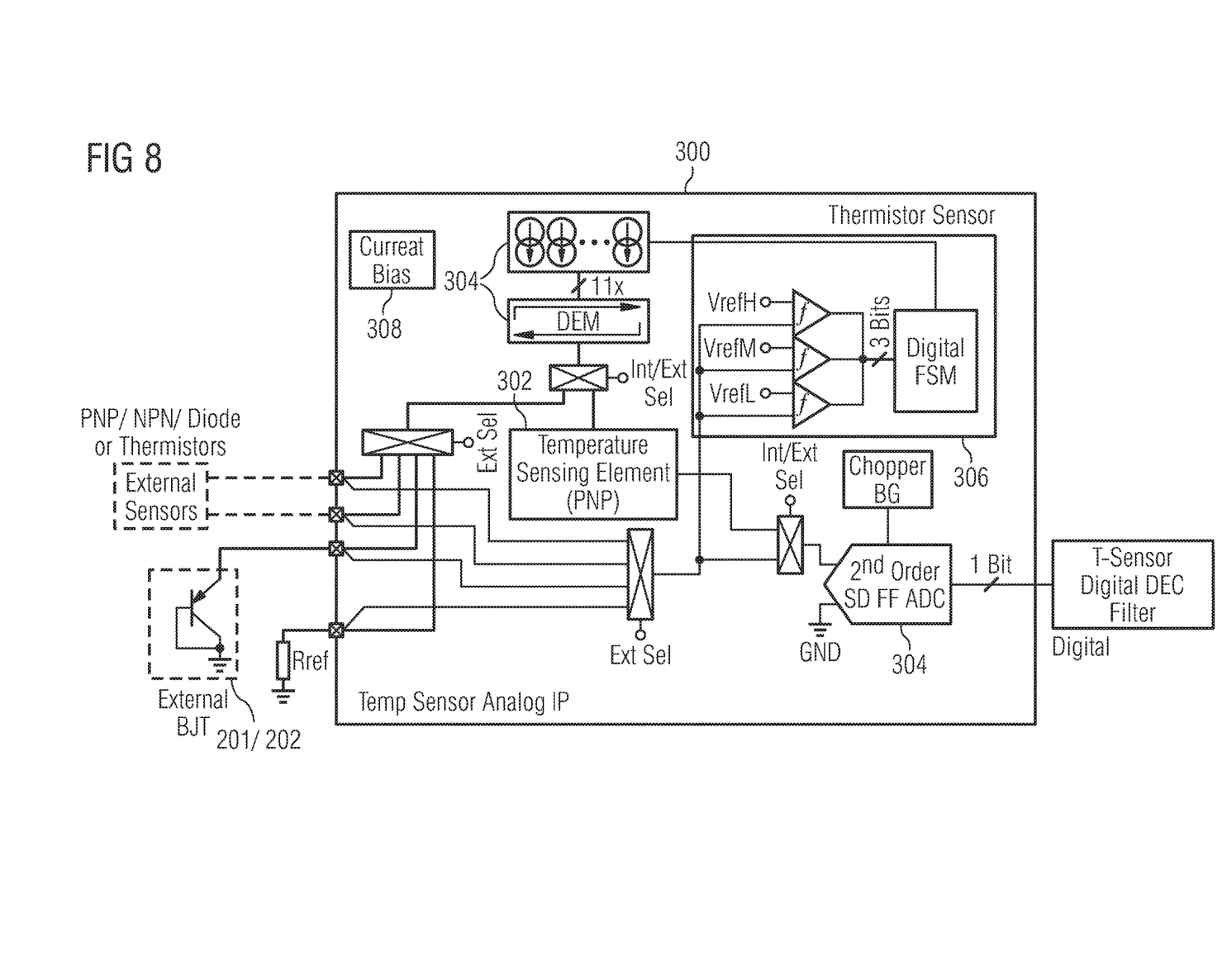
FIG. 8 illustrates a schematic diagram of an embodiment of temperature measurement circuity included in an eMarker IC of the one-chip temperature monitoring solution.

FIG. 8 illustrates an embodiment of the temperature measurement circuity 300 included in the eMarker IC 200. When sensing temperature with a remote PNP or NPN bipolar junction transistor (BJT) device 201/202, the routing series resistance can be cancelled via an additional scheme. This is only needed for remote sensing where the routing resistance becomes larger due to the site distance from the eMarker IC 200. To allow for resistance cancellation, two temperature sensor measurements are taken by a temperature sensing element 302, where an ADC (analog-to-digital converter) 304 performs a conversion sequentially for 2 times. The typical delta Vbe is the difference of the base-to-emitter junction voltage when passing a (N*Iunit) and (1*Iunit) 304 into the BJT device 302. When series resistance cancellation is required, the $2^{nd}$ measurement is done, where a $2^{nd}$ delta Vbe is generated by passing a (2N*Iunit) and (2*Iunit) 304 into the BJT device 201/202. Since the current ratio for each conversion is the same, the temperature readout should be the same if there is no series resistance. Hence, due to the presence of a finite routing resistance, the 2 temperature readouts will differ. The final temperature readout with the resistance error eliminated is given as Tread=T2−(T2−T1). The 'series resistance' referred to above is the series resistance of the new wire 204 added to the USB Type-C cable system described herein for connecting the current sensor 102 in the far side cable plug ('Cable Plug 2') to the eMarkerIC 200 in the near side cable plug ('Cable Plug 1').

Temperature measurement by eMarker ICs is standard and required especially when USB charging is done to detect thermal runaways. Conventionally, however, an eMarker IC is placed on both cable plug sites which results in greater overall system cost. The single eMarker IC USB Type-C cable system solution described herein performs the entire task of temperature measurement without the needed for a second eMarker IC at the far side cable plug ('Cable Plug 2'). The output from the temperature sensor 302 included in the eMarker IC 200 at the near side cable plug ('Cable Plug 1') gives the temperature readout in a multi-bit digital format. For example, in the case of an 11-bit output 304, a resolution of 0.25 deg C. is realized. The temperature reading is then passed from the eMarker IC 200 at the near side cable plug ('Cable Plug 1') to the host which decides on further actions. For example, the host can decide whether the temperature is too high for safe operation.

The integrated eMarker IC 200 uses the temperature information from both cable plugs to control the power distribution switch 208 included in the near side cable plug ('Cable Plug 1').

Figure 9:
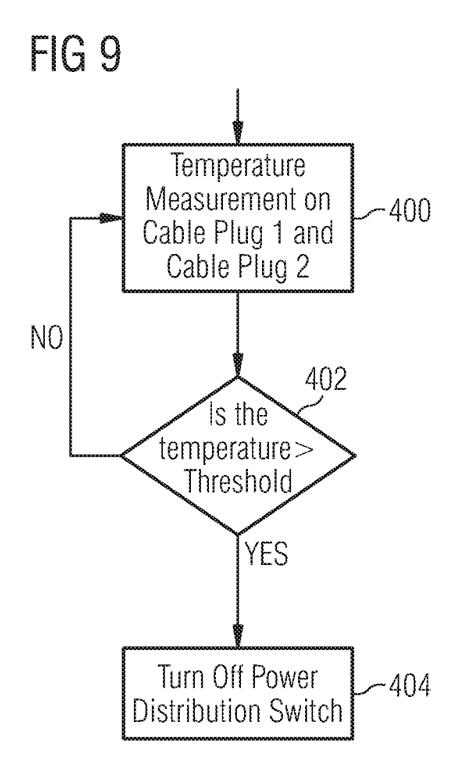
FIG. 9 illustrates a flow diagram of an embodiment of a method implemented by the single eMarker IC for controlling the open or closed state of a power distribution switch.

FIG. 9 illustrates a method implemented by the single eMarker IC 200 for controlling the open or closed state of the power distribution switch 208.

As explained above with reference to FIG. 8, the single eMarker IC 200 performs both internal (local) and remote temperature measurements using its own temperature sensing circuitry 302-308 and temperature data carried over the additional wire 204 from the sensor 102 located at the far side cable plug ('Cable Plug 2') (Block 400). If a temperature measurement is higher than a threshold value (Block 402), the eMarker IC 200 opens the power distribution switch 208 so as to disconnect the VBUS line coming from the source (Block 404).

Table 1 shows the USB full-featured Type-C standard cable assembly wiring ('Std. Part') plus the additional wiring ('Addl. Wire') for supporting the remote temperature sensing capability described herein.

TABLE 1

USB Full-Featured Type-C Standard Cable Assembly Wiring Plus New Wire

| No | USB TYPE-C Plug 1 Signal Name | Wire Signal Name | USB TYPE-C Plug 2 Signal Name | Remark |
|---|---|---|---|---|
| 1 | GND | GNID_PWRrt1 | GND | Std. Part of Type-C Cable |
| 2 | VBUS | PWND_VBUS1 | VBUS | Std. Part of Type-C Cable |
| 3 | CC | CC | CC | Std. Part of Type-C Cable |
| 4 | VCONN | PWR_VCONN | VCONN | Std. Part of Type-C Cable |
| 5 | DP1 | UTP_DP | DP1 | Std. Part of Type-C Cable |
| 6 | DP2 | UTP_DN | DP2 | Std. Part of Type-C Cable |
| 7 | SSTXp1 | SDPp1 | SSRXp1 | Std. Part of Type-C Cable |
| 8 | SSTXn1 | SDPn1 | SSRXn1 | Std. Part of Type-C Cable |
| 9 | SSRXp1 | SDPp2 | SSTXp1 | Std. Part of Type-C Cable |
| 10 | SSRXn1 | SDPn2 | SSTXn1 | Std. Part of Type-C Cable |
| 11 | SSTXp2 | SDPp3 | SSRXp2 | Std. Part of Type-C Cable |
| 12 | SSTXn2 | SDPn3 | SSRXn2 | Std. Part of Type-C Cable |
| 13 | SSRXp2 | SDPp4 | SSTXp2 | Std. Part of Type-C Cable |
| 14 | SSRXn2 | SDPn4 | SSTXn2 | Std. Part of Type-C Cable |
| 15 | SBU1 | SBU_A | SBU2 | Std. Part of Type-C Cable |
| 16 | SBU2 | SBU_B | SBU1 | Std. Part of Type-C Cable |
| 17 | Shield | Shield | Shield | Std. Part of Type-C Cable |
| 18 | N.A. | TS_1 | N.A. | Addl. Wire included in Type-C Cable |

The embodiments described herein provide a remote sensing concept that uses a single eMarker chip/IC 100/200 for providing temperature sensing capability at both plugs of an USB Type-C cable, and uses this information to control the power distribution switch 208 to cut off current in the VBUS line.

Figure 10:
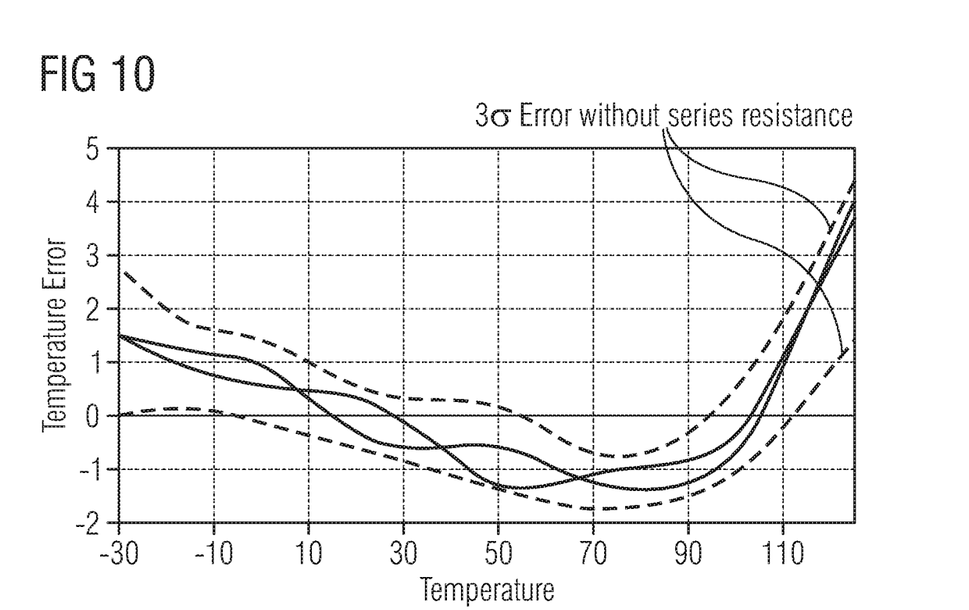
FIG. 10 illustrates characterized temperature readout error when 1 kΩ series resistance is inserted.

FIG. 10 shows the temperature readout error before calibration when a 1 kΩ series resistance is added via the additional wire 204 that connects the remote sensor 102 located at the far side cable plug ('Cable Plug 2') to the eMarker IC 200 located at the near side cable plug ('Cable Plug 1'). As seen, it falls into the 3σ error boundary of the sensor characterized without any series resistance inserted. It can therefore be concluded that the eMarker IC 200 can measure temperature with an equivalent precision regardless of the series resistance.

Figure 11:
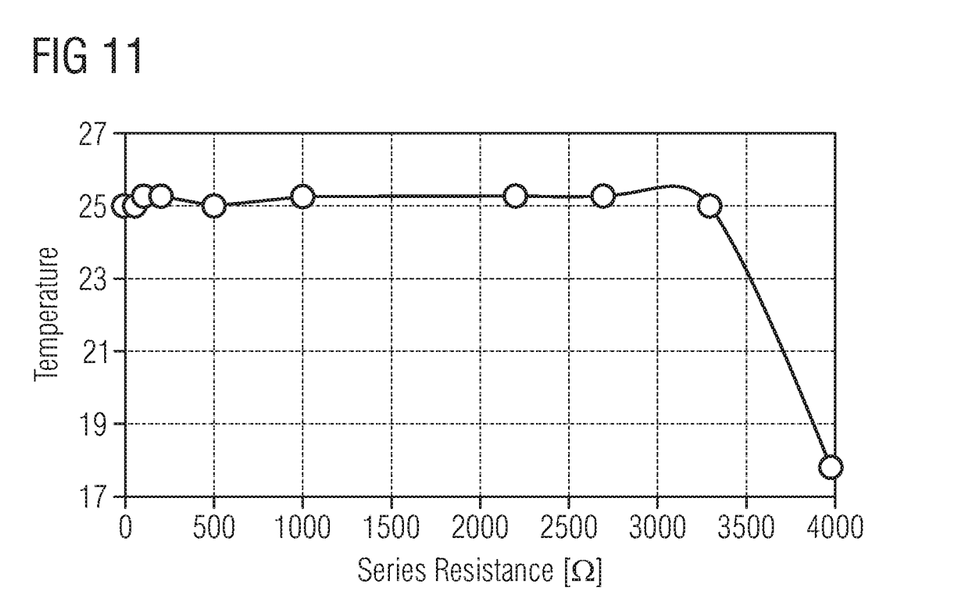
FIG. 11 illustrates temperature readout with series resistance.

FIG. 11 shows the temperature readout with the series resistance calibrated. It can be observed that the eMarker IC 200 can tolerate up to a series resistance of 3.2 kΩ before showing a degradation in accuracy.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A Type-C USB cable, comprising:
   a near side cable plug;
   a far side cable plug;
   a single eMarker IC integrated in one of the cable plugs, the single eMarker IC including an internal temperature sensing element;
   a temperature sensor integrated in the opposite cable plug as the single eMarker IC; and
   a wire terminated within the Type-C USB cable and connecting the temperature sensor to the single eMarker IC,
   wherein the single eMarker IC is configured to generate temperature measurement information based on temperature sensed by the internal temperature sensing element of the single eMarker IC and temperature sensed by the temperature sensor and carried to the eMarker IC over the wire that connects the temperature sensor to the single eMarker IC.

2. The Type-C USB cable of claim 1, wherein the single eMarker IC is further configured to open a power distribution switch integrated in the same cable plug as the eMarker IC if the temperature measurement information exceeds a threshold value, so as to disconnect a VBUS line coming from a source connected to the Type-C USB cable.

3. The Type-C USB cable of claim 1, wherein the single eMarker IC is further configured to compensate for a series resistance of the wire that connects the temperature sensor to the single eMarker IC.

4. The Type-C USB cable of claim 3, wherein the single eMarker IC is configured to compensate for the series resistance of the wire that connects the temperature sensor to the single eMarker IC by taking two temperature sensor measurements, converting the temperature sensor measurements to respective digital values T1 and T2, and calculating a final temperature readout Tread=T2−(T2−T1).

5. The Type-C USB cable of claim 4, wherein the single eMarker IC is configured to take each temperature sensor measurement by passing different ratio-metric currents into a bipolar junction device and sensing a difference of a base-to-emitter junction voltage of the bipolar junction transistor device for each ratio-metric current.

6. The Type-C USB cable of claim 4, wherein each digital value has a length of 11 bits and a resolution of 0.25 deg C.

7. A method of temperature sensing for a Type-C USB cable that includes a near side cable plug, a far side cable plug, a single eMarker IC integrated in one of the cable plugs, a temperature sensor integrated in the opposite cable plug as the single eMarker IC, and a wire terminated within the Type-C USB cable and connecting the temperature sensor to the single eMarker IC, the method comprising
   sensing temperature by an internal temperature sensing element of the single eMarker IC;
   sensing temperature by the temperature sensor;
   carrying the temperature sensed by the temperature sensor to the eMarker IC over the wire that connects the temperature sensor to the single eMarker IC; and generating temperature measurement information by the single eMarker IC based on the temperature sensed by the internal temperature sensing element of the single eMarker IC and the temperature sensed by the temperature sensor.

8. The method of claim 7, further comprising:
opening a power distribution switch integrated in the same cable plug as the eMarker IC if the temperature measurement information exceeds a threshold value, so as to disconnect a VBUS line coming from a source connected to the Type-C USB cable.

9. The method of claim 7, further comprising:
compensating for a series resistance of the wire that connects the temperature sensor to the single eMarker IC.

10. The method of claim 9, wherein compensating for the series resistance of the wire that connects the temperature sensor to the single eMarker IC comprises:
taking two temperature sensor measurements;
converting the temperature sensor measurements to respective digital values T1 and T2; and
calculating a final temperature readout Tread=T2−(T2−T1).

11. The method of claim 10, wherein taking each temperature sensor measurement comprises:
passing different ratio-metric currents into a bipolar junction device; and
sensing a difference of a base-to-emitter junction voltage of the bipolar junction transistor device for each ratio-metric current.

12. The method of claim 10, wherein each digital value has a length of 11 bits and a resolution of 0.25 deg C.

13. A Type-C USB cable system, comprising:
a near side cable plug;
a source connected to the near side cable plug;
a far side cable plug;
a sink connected to the far side cable plug;
a single eMarker IC integrated in one of the cable plugs, the single eMarker IC including an internal temperature sensing element;
a temperature sensor integrated in the opposite cable plug as the single eMarker IC; and
a wire terminated within the Type-C USB cable and connecting the temperature sensor to the single eMarker IC,
wherein the single eMarker IC is configured to generate temperature measurement information based on temperature sensed by the internal temperature sensing element of the single eMarker IC and temperature sensed by the temperature sensor and carried to the eMarker IC over the wire that connects the temperature sensor to the single eMarker IC.

14. The Type-C USB cable system of claim 13, wherein the single eMarker IC is further configured to pass the temperature measurement information to the source connected to the near side cable plug.

15. The Type-C USB cable system of claim 13, wherein the single eMarker IC is further configured to open a power distribution switch integrated in the same cable plug as the eMarker IC if the temperature measurement information exceeds a threshold value, so as to disconnect a VBUS line coming from the source.

16. The Type-C USB cable system of claim 13, wherein the single eMarker IC is further configured to compensate for a series resistance of the wire that connects the temperature sensor to the single eMarker IC.

17. The Type-C USB cable system of claim 16, wherein the single eMarker IC is configured to compensate for the series resistance of the wire that connects the temperature sensor to the single eMarker IC by taking two temperature sensor measurements, converting the temperature sensor measurements to respective digital values T1 and T2, and calculating a final temperature readout Tread=T2−(T2−T1).

18. The Type-C USB cable system of claim 17, wherein the single eMarker IC is configured to take each temperature sensor measurement by passing different ratio-metric currents into a bipolar junction device and sensing a difference of a base-to-emitter junction voltage of the bipolar junction transistor device for each ratio-metric current.

19. The Type-C USB cable system of claim 17, wherein each digital value has a length of 11 bits and a resolution of 0.25 deg C.

* * * * *